United States Patent
Lindley et al.

(10) Patent No.: US 8,300,953 B2
(45) Date of Patent: Oct. 30, 2012

(54) CATEGORIZATION OF DIGITAL MEDIA BASED ON MEDIA CHARACTERISTICS

(75) Inventors: Gregory Charles Lindley, Sunnyvale, CA (US); Timothy B. Martin, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 376 days.

(21) Appl. No.: 12/134,074

(22) Filed: Jun. 5, 2008

(65) Prior Publication Data
US 2009/0307261 A1    Dec. 10, 2009

(51) Int. Cl.
G06K 9/68 (2006.01)
G06K 9/66 (2006.01)
G06F 17/30 (2006.01)

(52) U.S. Cl. ........ 382/219; 382/190; 707/749; 707/758; 707/803; 707/805

(58) Field of Classification Search .......... 707/609, 707/705–707, 730, 797–798, 821–822, 828, 707/749, 758, 803, 805, 913–916; 382/100, 382/118, 157, 190, 305, 307, 219; 348/231.2–231.6; 345/418–419, 594, 619, 634, 650, 676; 715/721, 715/838
See application file for complete search history.

(56) References Cited

U.S. PATENT DOCUMENTS

| | | | |
|---|---|---|---|
| 6,408,301 B1* | 6/2002 | Patton et al. | 707/741 |
| 6,590,586 B1* | 7/2003 | Swenton-Wall et al. | 715/730 |
| 6,714,672 B1* | 3/2004 | Berestov et al. | 382/154 |
| 6,804,684 B2* | 10/2004 | Stubler et al. | 1/1 |
| 7,720,258 B1* | 5/2010 | Ullmann | 382/103 |
| 2002/0069218 A1* | 6/2002 | Sull et al. | 707/501.1 |
| 2002/0070982 A1* | 6/2002 | Hill et al. | 345/835 |
| 2002/0146176 A1* | 10/2002 | Meyers | 382/218 |
| 2003/0033296 A1* | 2/2003 | Rothmuller et al. | 707/3 |
| 2003/0156304 A1* | 8/2003 | Fedorovskaya et al. | 358/527 |
| 2004/0128308 A1* | 7/2004 | Obrador | 707/102 |
| 2005/0055372 A1* | 3/2005 | Springer et al. | 707/104.1 |
| 2005/0084154 A1* | 4/2005 | Li et al. | 382/190 |
| 2006/0013434 A1* | 1/2006 | Smith et al. | 382/100 |
| 2006/0078201 A1* | 4/2006 | Kim et al. | 382/181 |
| 2006/0184574 A1* | 8/2006 | Wu et al. | 707/104.1 |
| 2006/0206470 A1* | 9/2006 | McIntyre | 707/3 |

(Continued)

FOREIGN PATENT DOCUMENTS
WO    WO 2007/091243    * 8/2007

OTHER PUBLICATIONS

Hideyasu Sasaki et al. "A Prototype Implementation of Metadata Generation for Image Retrieval",Proceedings of the 2004 International Symposium on Applications and the Internet Workshops (SAINTW'04), 7 pages.*

(Continued)

Primary Examiner — Srirama Channavajjala
(74) Attorney, Agent, or Firm — Wong, Cabello, Lutsch, Rutherford & Brucculeri, L.L.P.

(57) ABSTRACT

Digital media categorization can include receiving information including a plurality of media objects and a metadata tag descriptive of at least a first media object; comparing the first media object with a second media object; and selectively associating the first media object's metadata tag with the second media object based on a result of the comparison. Each media object can include a digital image.

47 Claims, 9 Drawing Sheets

U.S. PATENT DOCUMENTS

| | | | |
|---|---|---|---|
| 2006/0251292 A1* | 11/2006 | Gokturk et al. | 382/103 |
| 2006/0251339 A1* | 11/2006 | Gokturk et al. | 382/305 |
| 2006/0271287 A1* | 11/2006 | Gold et al. | 701/211 |
| 2007/0110338 A1* | 5/2007 | Snavely et al. | 382/305 |
| 2007/0124333 A1* | 5/2007 | Bontempi | 707/104.1 |
| 2007/0195344 A1* | 8/2007 | Mochizuki et al. | 358/1.9 |
| 2008/0002892 A1* | 1/2008 | Jelonek et al. | 382/224 |
| 2008/0162450 A1* | 7/2008 | McIntyre et al. | 707/5 |
| 2008/0240702 A1* | 10/2008 | Wassingbo et al. | 396/310 |
| 2009/0006471 A1* | 1/2009 | Richardson et al. | 707/104.1 |
| 2009/0150328 A1* | 6/2009 | Silver | 707/1 |
| 2010/0027893 A1* | 2/2010 | Hayber | 382/218 |

OTHER PUBLICATIONS

Toru Fukumoto, "An analysis of image retrieval behavior for metadata type image database", Information Processing and Management 42 (2006) 723-728.*

Joakim Söderberg, "Automatic Tag Generation for Photos Using Contextual Information and Description Logics", CBMI'2010, 7 pages.*

* cited by examiner

CATEGORIZATION OF DIGITAL MEDIA BASED ON MEDIA CHARACTERISTICS

TECHNICAL FIELD

The present disclosure relates to digital media categorization.

BACKGROUND

Digital media such as digital images or video can be generated, for example, by a digital camera, camcorder, television camera, or mobile phone. These digital images or videos can be labeled with descriptive information for future viewing, browsing, or searching. Such descriptive information can include, for example, a name of a person, a name of place, or event information. For example, a user can label a digital image depicting a person with the name of that person. Later, a user can search for images labeled with that person's name.

SUMMARY

This specification describes technologies that, among other things, categorize digital media.

The subject matter described can be implemented in methods that include receiving information including a plurality of media objects and a metadata tag descriptive of at least a first media object; comparing the first media object with a second media object; and selectively associating the first media object's metadata tag with the second media object based on a result of the comparison. Each media object can include a digital image. Other implementations can include corresponding systems, apparatus, and computer program products.

These, and other aspects, can include one or more of the following features. The comparing can include detecting a first feature of the digital image of the first media object; detecting a second feature of the digital image of the second media object; and comparing the first feature with the second feature. The first feature can be a depiction of at least a portion of a person. The metadata tag can include a name of the person. The comparing can include accessing a first timestamp of the first media object; accessing a second timestamp of the second media object; and comparing the first timestamp with the second timestamp. The comparing can include accessing first geographical coordinates of the first media object; accessing second geographical coordinates of the second media object; and comparing the first geographical coordinates with the second geographical coordinates. The features can also include providing a user interface to present the first media object to a user and displaying in the user interface a prompt that requests a metadata tag for the first media object. The digital image of the first media object can include a frame of a first digital video. The digital image of the second media object can include a frame of either the first digital video or a second digital video.

The subject matter described can also be implemented in methods that include receiving multiple media objects, each media object including a digital image, wherein one or more of the received media objects are associated with one or more metadata tags; performing one or more comparisons between the received media objects; generating a digital media album responsive to results of the one or more comparisons, wherein the digital media album comprises at least a portion of the received media objects; and associating a metadata tag of a media object in the digital media album with the digital media album. Other implementations can include corresponding systems, apparatus, and computer program products.

These, and other aspects, can include one or more of the following features. One or more of the comparisons can be based on time. One or more of the comparisons can be based on geographical coordinates of a media object. One or more of the comparisons are based on a feature of a digital image. The feature can be a facial feature.

A system can include a communication interface and a processor coupled with the communication interface. The processor can be configured to perform operations including receiving information from the communication interface, the information including a plurality of media objects, each media object comprising a digital image, and a metadata tag descriptive of at least a first media object; comparing the first media object with a second media object; and selectively associating the first media object's metadata tag with the second media object based on a result of the comparison.

The system can include one or more of the following features. The system can include a storage medium. The communication interface can be coupled with a storage media medium, a communication network, or both. The comparing can include detecting a first feature of the digital image of the first media object; detecting a second feature of the digital image of the second media object; and comparing the first feature with the second feature. The first feature can be a depiction of at least a portion of a person. The metadata tag can include a name of the person. The comparing can include accessing a first timestamp of the first media object; accessing a second timestamp of the second media object; and comparing the first timestamp with the second timestamp. The comparing can include accessing first geographical coordinates of the first media object; accessing second geographical coordinates of the second media object; and comparing the first geographical coordinates with the second geographical coordinates. The features can also include providing a user interface to present the first media object to a user and displaying in the user interface a prompt that requests a metadata tag for the first media object. The digital image of the first media object can include a frame of a first digital video. The digital image of the second media object can include a frame of either the first digital video or a second digital video.

Particular implementations of the subject matter described in this specification may be implemented to realize one or more of the following potential advantages. Selectively associating the metadata tag of a media object with another media object based on a result of a comparison between the media objects can save a user from manually making the association. The comparison methods can be used to automatically generate digital media albums.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Devices such as digital cameras, camcorders, television cameras, or mobile phones can produce multiple media objects. A media object can be labeled with one or more metadata tags. A metadata tag can be descriptive of a media object's content. For example, a digital image depicting Bob can be labeled with a metadata tag of "Bob."

Labeling media objects with metadata tags can be beneficial for future access of the media objects. But manually labeling media objects with metadata tags can be a time consuming process. The time for such a process can be reduced by labeling just a portion of the media objects, automatically detecting similarities between the media objects, and then associating a tag of one media object to another media object if at least one similarity exists between the two media objects. In other words, a large set of media objects can effectively be labeled based on labels manually designated for fewer than all of the media objects in the set.

Figure 1A:
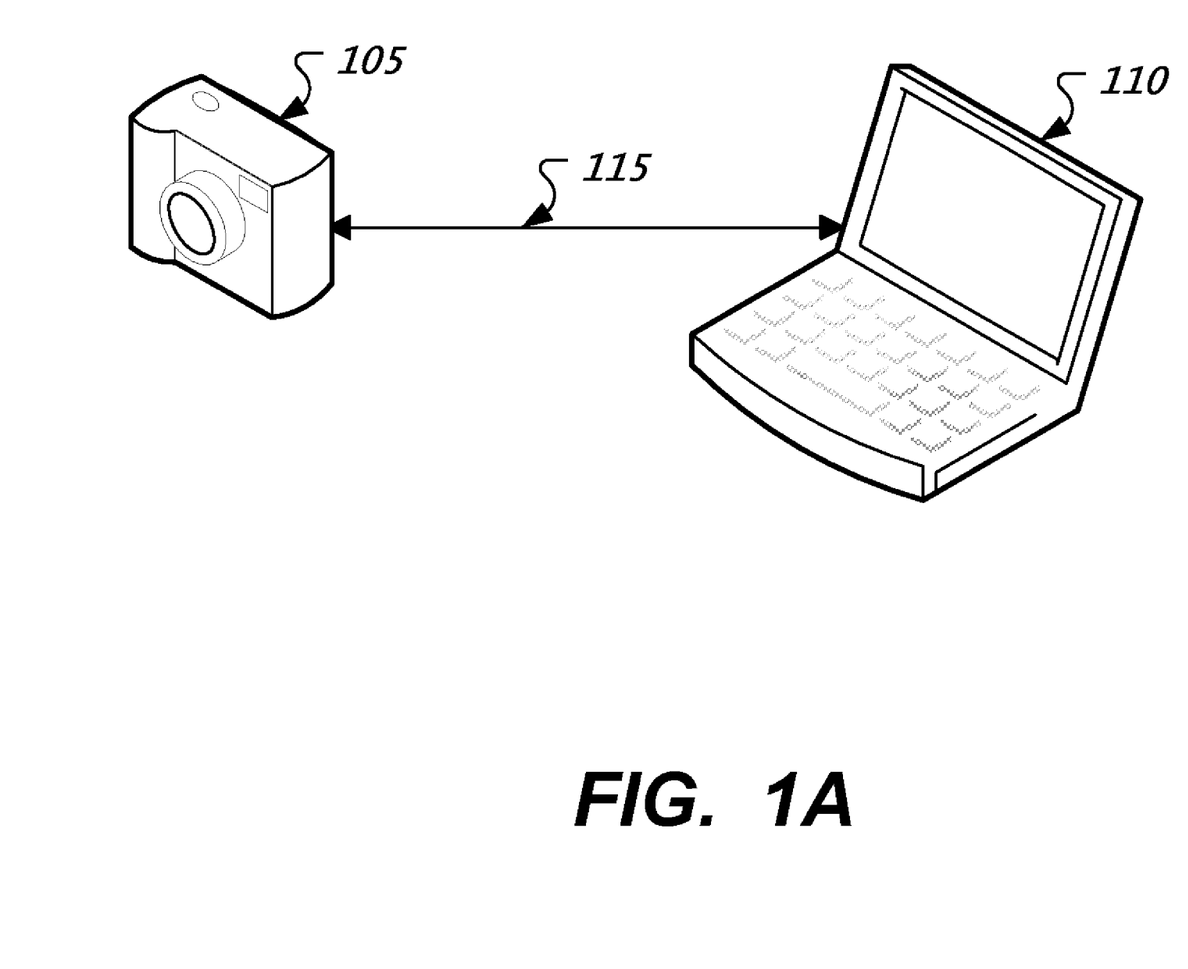
FIGS. 1A, B show different examples of systems for uploading media objects.

FIG. 1A shows an example of a system for uploading media objects. A photographic device such as a camera 105, a mobile phone with a camera, or camcorder can produce media objects. A media object can include a digital image represented in a format defined by standards such as the Joint Photographic Experts Group (JPEG) standard or Graphics Interchange Format (GIF).

A photographic device can record the location of where of a digital image was taken and/or a timestamp of when the digital image was taken. The location information and/or timestamp can be associated with the digital image. In some implementations, photographic devices can be equipped with a text entry device such as a keyboard to allow a user to label a digital image with a metadata tag. In some implementations, photographic devices can be equipped with a microphone to allow a user to record speech or sounds as a metadata tag.

The camera 105 can transfer data such as media objects and associated metadata to a computer 110 over a communication link 115. The communication link 115 can be wireless, wired, or a combination thereof. A wireless communication link can use protocols such as Bluetooth®, IEEE 802.11 standards, or other wireless protocols for sending and receiving data. The communication link 115 can include a data cable such as a Universal Serial Bus (USB) cable. In some implementations, the camera 105 can include a removable digital storage medium such as a USB memory stick or card. The removable digital storage medium can store media objects and associated data. A user can upload media objects to the computer 110 by removing the storage medium from camera 105 and inserting the storage medium into a corresponding slot on computer 110. The computer 110 can transfer data from the storage medium into a local storage medium such as a hard drive of computer 110. The process of uploading data via a removable digital storage medium can be used in lieu of or in combination with the communication link 115.

Figure 1B:
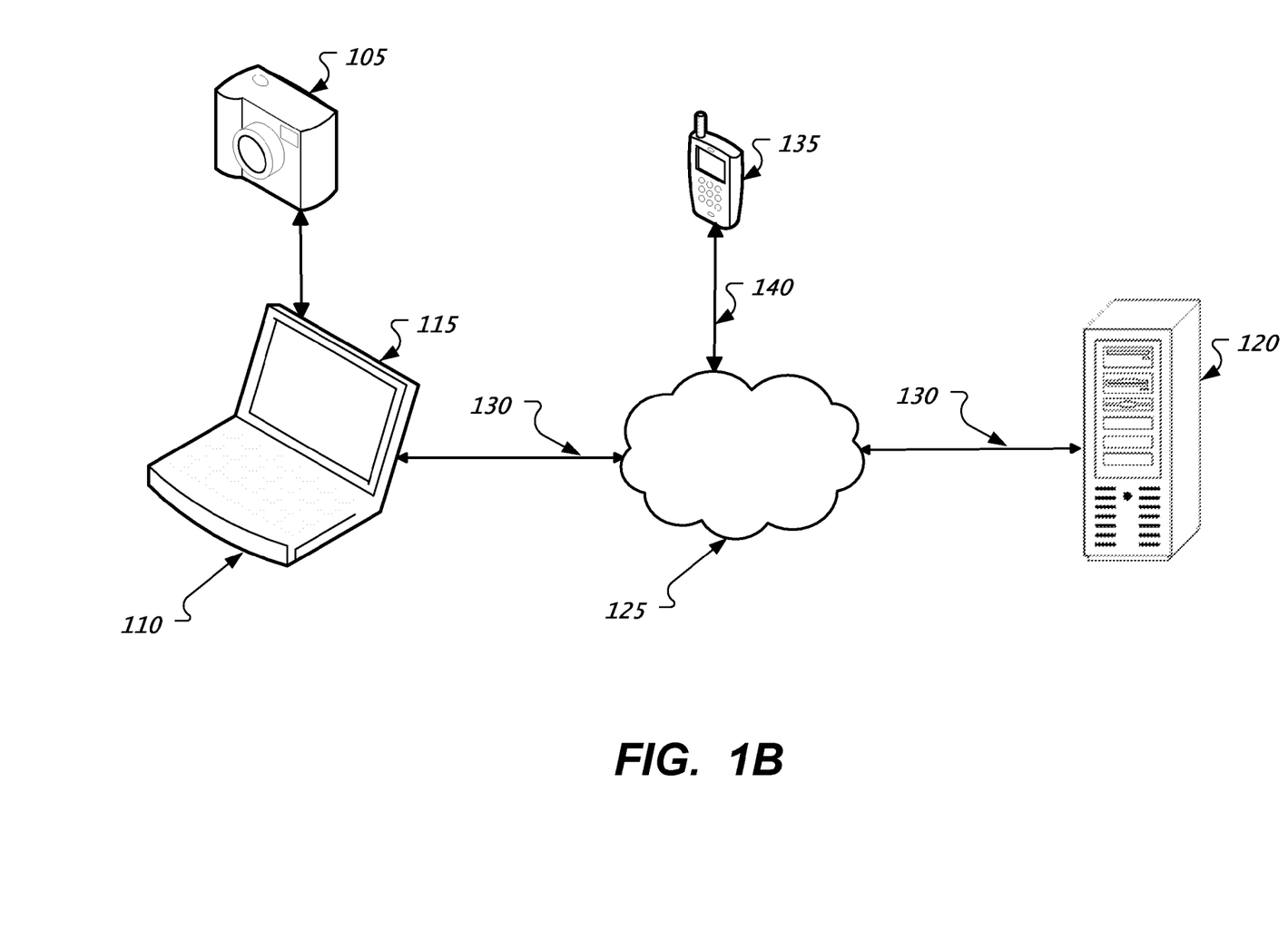

FIG. 1B shows a different example of a system for uploading media objects. A camera 105 can upload media objects to computer 110 over a communication link 115. The computer 110 can upload media objects to a server 120. The computer 110 and server 120 can be connected to a communication network 125 such as the Internet or a Local Area Network (LAN) via network links 130. The server 120 can be coupled to one or more communication interfaces that can couple to a communication network or storage mediums such as hard drives or USB non-volatile memory devices. In some implementations, a camera 105 can communicate with server 120 to upload media objects.

A wireless device such as a camera equipped mobile phone 135 can upload media objects to server 120 via a wireless link 140 to the communication network 125. The wireless link 140 can be provided by a mobile phone network or a local area wireless network. The server 120 can stored and process the uploaded media objects for a user. A user can use multiple cameras or wireless devices to upload media objects.

Figure 2A:
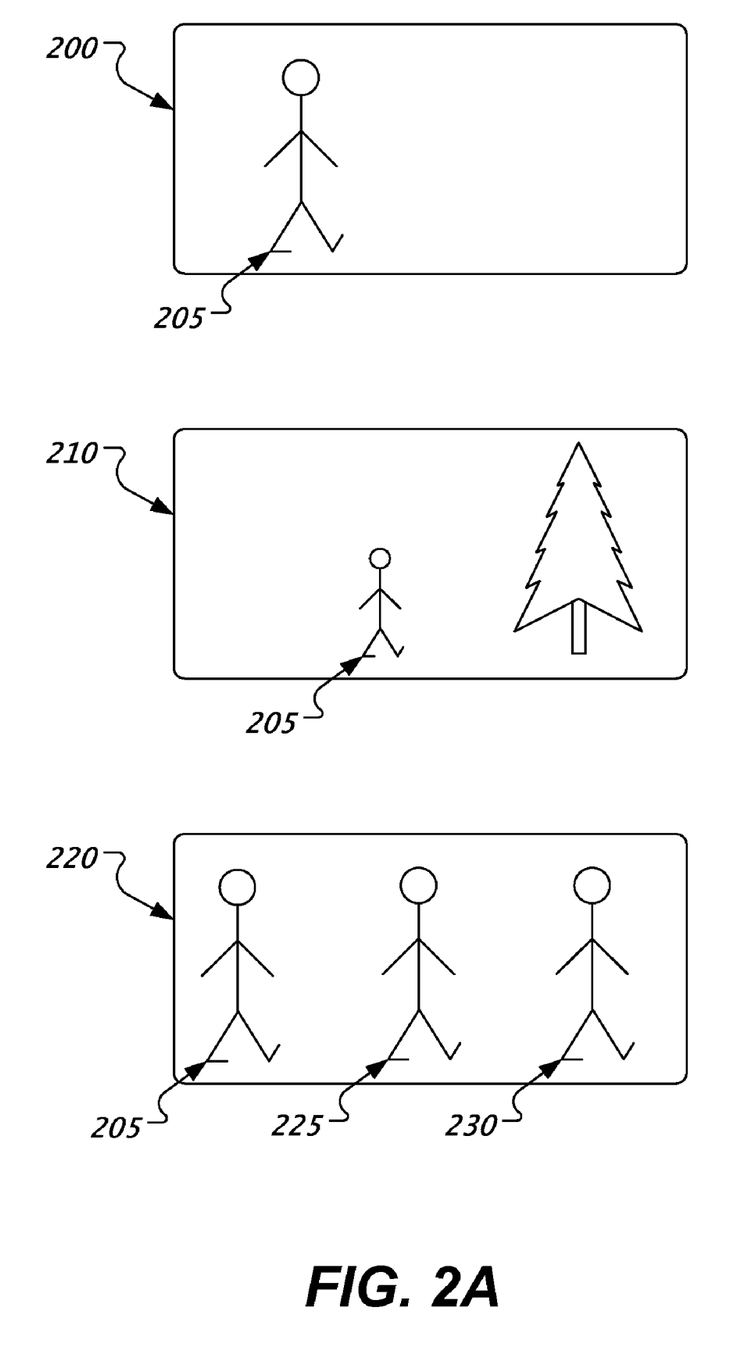
FIGS. 2A, B, C show different examples of associations between digital images.

FIG. 2A shows an example of an association between digital images based on one or more similar features between digital images. Features can include, for example, a person, a face, an object, and colors of the image. Multiple media objects including digital images 200, 210, 220 can be compared for similarities. For example, digital image 200 can depict a person 205, digital image 210 can depict the same person 205 at a later time, and digital image 220 can depict the person 205 standing with other people 225, 230. Because digital image 200 and digital image 210 have a person 205 in common, they can have an association between them. Digital image 220 can have an association with either or both images 210, 220 because of having person 205 in common. Other associations between images 210, 210, 220 can be possible.

Figure 2B:
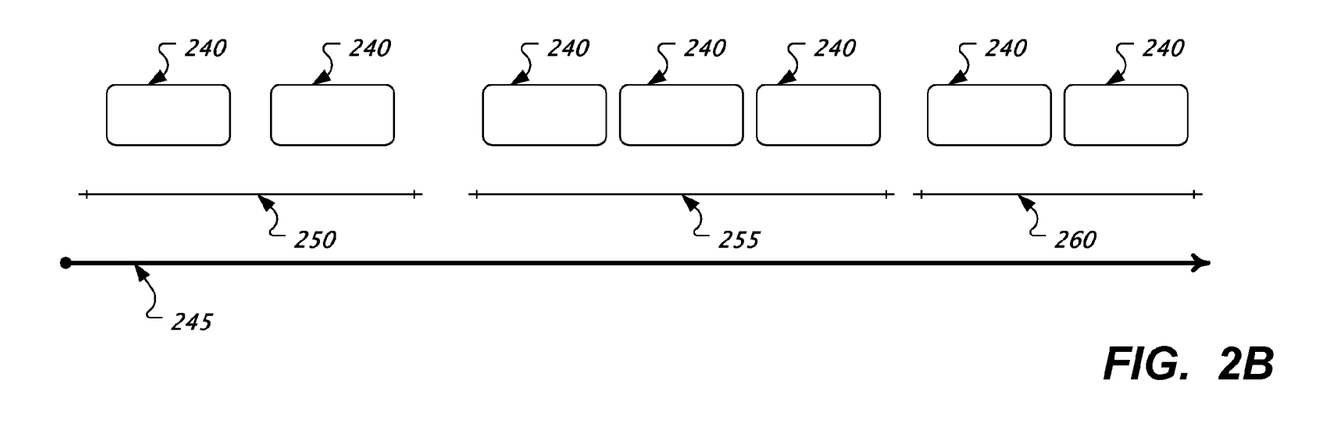

FIG. 2B shows an example of an association between digital images based on time. Digital images 240 can be taken over time. Time, in FIG. 2B, can be represented by a time axis 245 where time advances from left to right. The digital images 240 can be arranged on the axis 245 according to timestamps of the digital images 240. The digital images 240 can be grouped together by partitioning axis 245 into intervals 250, 255, 260. Each digital image of an interval can be associated with the other digital images of the interval. The time period and properties for defining an interval can be user, software, and/or server configurable. In some implementations, intervals can be defined by a fixed amount of time. For example, for every 24 hour period, a new interval can be defined. In some implementations, an interval can be defined by an amount of time starting at a specified digital image. Other techniques for defining a subinterval can be possible. Further, other associations between images 240 can be possible.

Figure 2C:
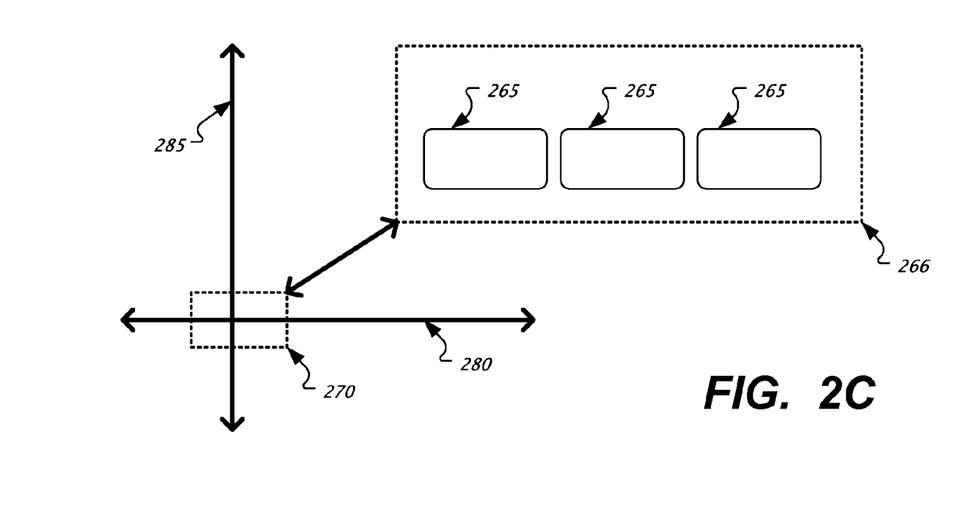

FIG. 2C shows an example of an association between digital images based on geographic location. A group 266 of digital images 265 can be taken in or around a geographic location 270. In some implementations, a center of location 270 can be defined by geographic coordinates such as coordinates specified by a line of latitude 280 and a line of longitude 285. Other coordinate systems can be used to represent location 270. The boundary for location 270 can be defined by a user, geometric shapes, and/or additional geographic coordinates. Digital images 265 can be associated together by a common location 270 of the images 265. Other associations between images 265 can be possible.

Figure 3:
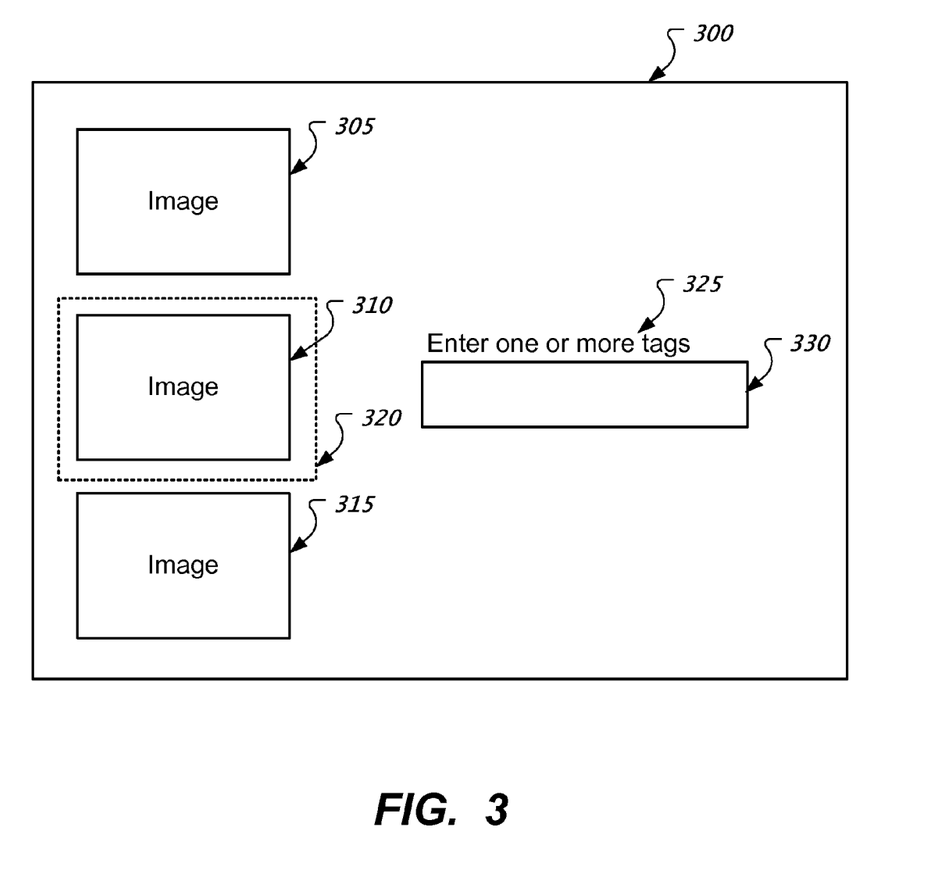
FIG. 3 shows an example of user interface for entering tags.

FIG. 3 shows an example of user interface for entering tags. A user interface 300 can be generated by a standalone application or generated by a server such as server 120. The user interface 300 can be displayed, for example, on computer 110. After media objects such as digital images have been uploaded to either computer 110 or server 120, the user interface 300 can display at least a portion of the uploaded digital images 305, 310, 315. An image can be selected in the user interface 300 by a user input such as a mouse click on an image 305, 310, 315. A selected image 310 can be highlighted to denote that the image 310 has been selected. For example, a dashed box 320 can be displayed around the selected image 310. A prompt 325 for entering one or more tags can be displayed in the user interface 300 along with a text entry box 330. After entering a tag, a user can select another image. In some implementations, the user interface 300 can advance to the next image. Images that have tags already can be skipped or revisited depending on user preferences or application defaults.

Figure 4:
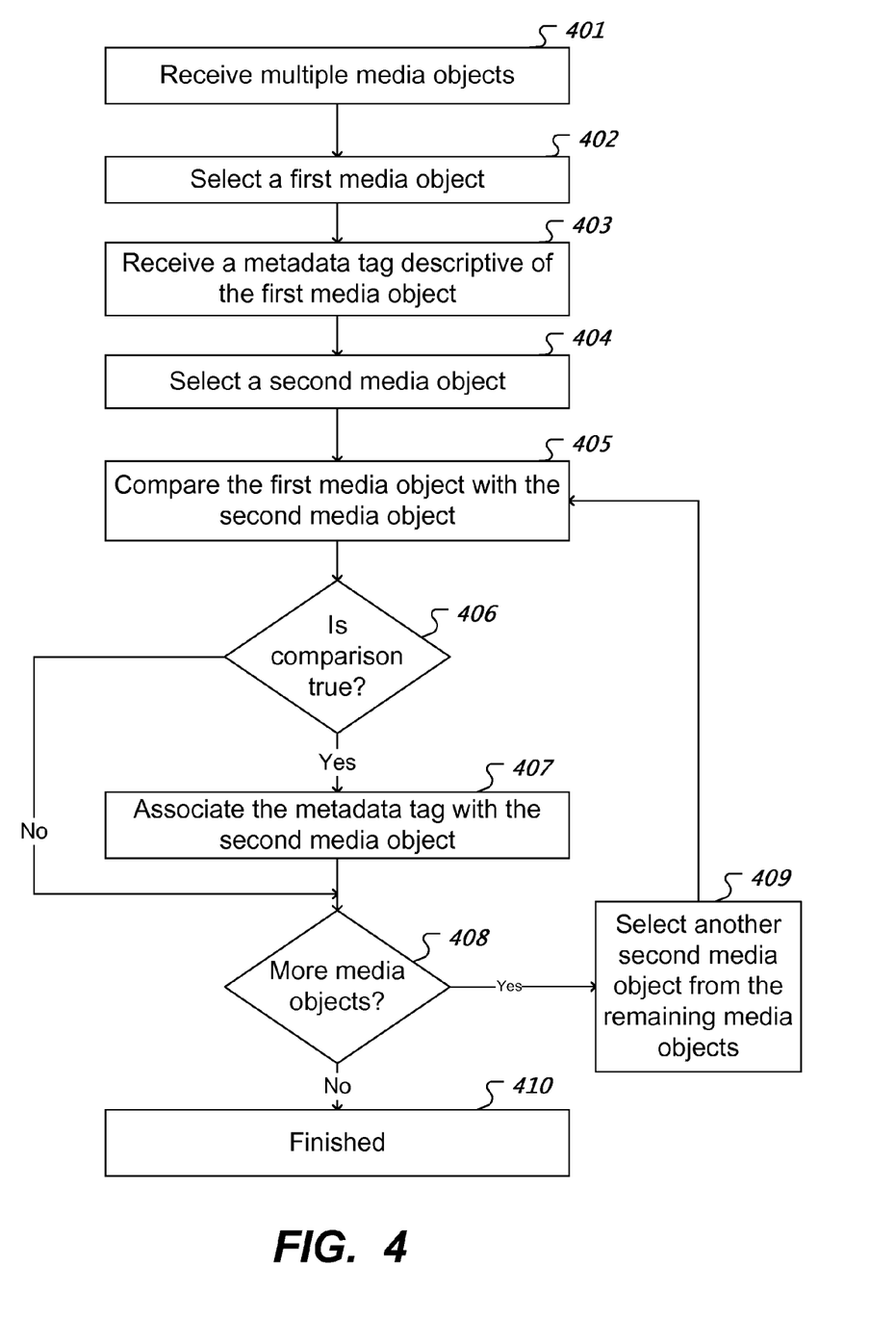
FIG. 4 shows an example of an association process.

FIG. 4 shows an example of an association process. An association process can run on processor electronics such as computer 110 or server 120. An association process can receive 401 multiple media objects. Receiving techniques can include receiving data from a storage medium, over a communication network, over a communication interface, or a combination thereof. A first media object can be selected 402 from the media objects by either a user or automatically by the process. The process can receive 403 a metadata tag descriptive of the first media object. Sources for the metadata tag can include the user interface 300, a file associated with the media object, or a tag embedded in the media object. More than one tag can be received for a media object. In some implementations, multiple tags can be treated as a single tag. For example, a tag can include a space delimited list of names. The process can select a second media object 404 from the received media objects. The first media object can be compared 405 to the second media object. If the comparison 406 is true, then the metadata tag can be associated 407 with the second media object. If there are more media objects remaining 408, then another second media object can be selected 409 from the remaining media objects and a new comparison can be made 405. If there are no more media objects remaining, then the process can finish 410.

Figure 5A:
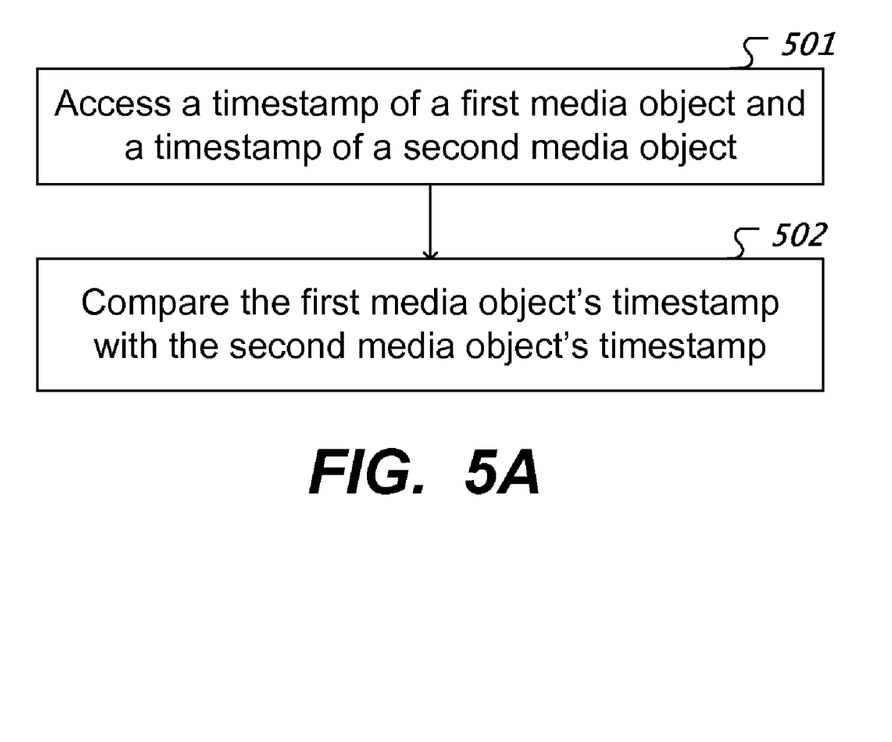
FIGS. 5A, B show different examples of a comparison between media objects.

FIG. 5A shows an example of a comparison between media objects based on timestamps. The comparison 405 of FIG. 4 can employ one or more types of comparison methods. In some implementations, the comparison 405 can include accessing 501 a timestamp of a first media object and a timestamp of a second media object. A timestamp can be included within a media object or in a file or data structure associated with the media object. A timestamp can be indicative of when the media object was produced. For example, a camera can record the time of when a digital image was taken and store the time as a timestamp along with the digital image as a media object. The comparison 405 can include comparing 502 the first media object's timestamp with the second media object's timestamp. If the difference between the first media object's timestamp and the second media object's timestamp is within a specified time criterion, then an association can be made between the first media object and the second media object. The timestamp of the second media object can chronologically come after or before the timestamp of the first media object. Thus, in some implementations, an absolute value of the difference can be compared to the time criterion to determine an association. The specified time criterion can be configured by a user, a process performing the comparison, or by a default value. For example, the time criterion can be 3-5 second for associating media objects taken in rapid succession. In another example, the time criterion can be 24 hours for associating media objects taken during a day.

Figure 5B:
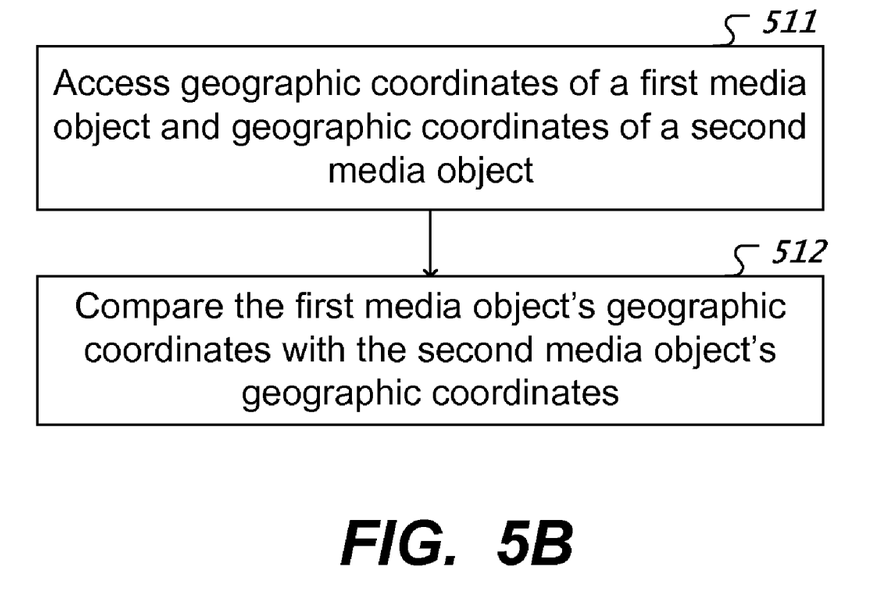

FIG. 5B shows an example of a comparison between media objects based on geographic coordinates. In some implementations, the comparison 405 of FIG. 4 can include accessing 511 geographic coordinates of a first media object and geographic coordinates of a second media object. In some implementations, geographic coordinates can include values for latitude and longitude. Geographic coordinates can be included within a media object or in a file or data structure associated with the media object. For example, a media object can include a digital image, and geographic coordinates representing a location of where the digital image was captured. The comparison 405 can include comparing 512 the first media object's geographic coordinates with the second media object's geographic coordinates. A distance between the first media object's geographic coordinates and the second media object's geographic coordinates can be computed. If the distance is less than or equal to a specified distance criterion, an association between the first and second media objects can be made. The specified distance criterion can be configured by a user, a process performing the comparison, or by a default value.

Figure 6:
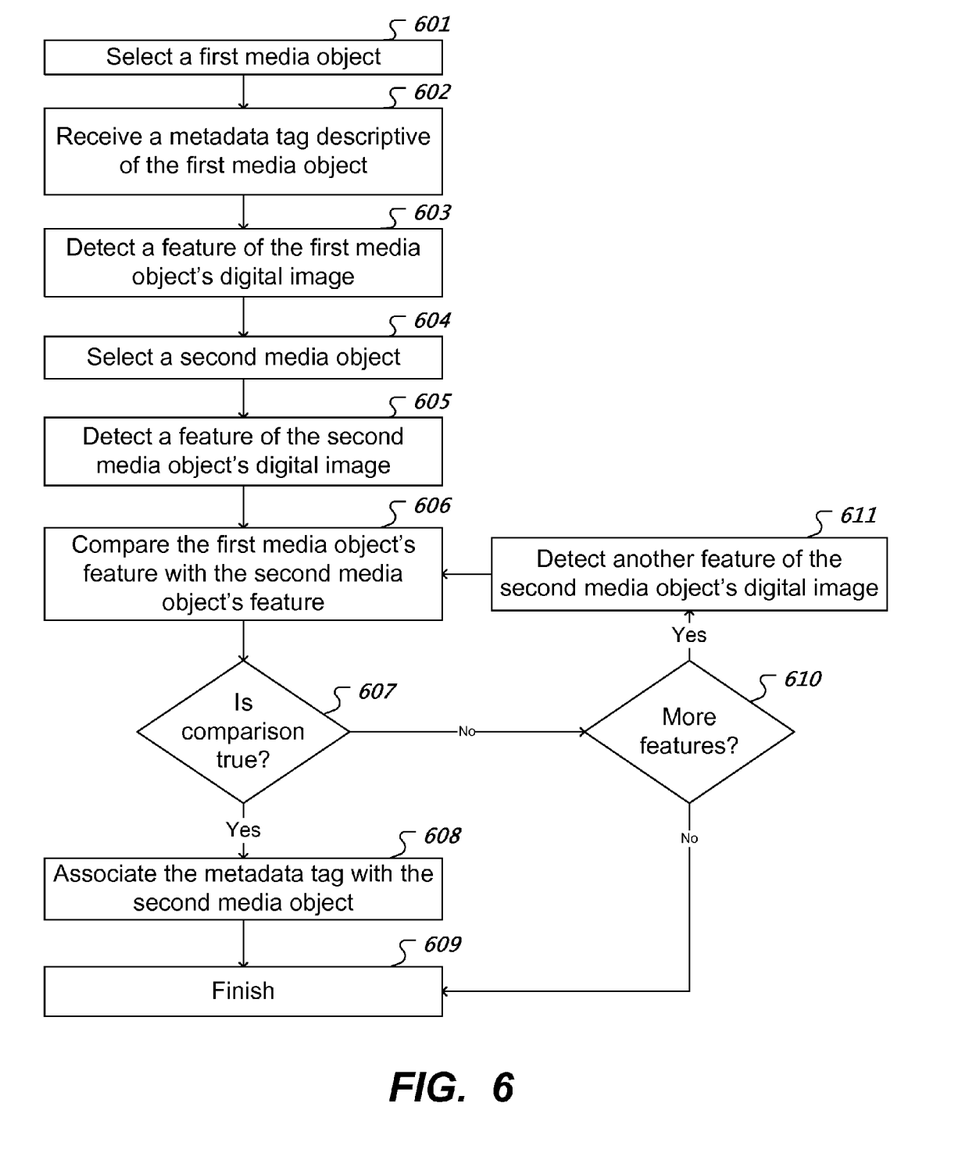
FIG. 6 shows an example of an association process relating to feature detection.

FIG. 6 shows an example of an association process relating to feature detection. An association process can select 601 a first media object from a group of media objects. In some implementations, an association process can automatically select the first media object or can provide a user interface for a user to make the selection. The association process can receive 602 a metadata tag descriptive of the first media object. The metadata tag can be a text string and can include information such as a name or an attribute of the media object. A metadata tag can be generally associated with the media object or can be associated with a specified person or object of the media object's digital image. A feature of the first media object's digital image can be detected 603. Features can include people, a portion of a person, objects, landforms, buildings, and other characteristics of the media object such as color and hue. For example, a person's face can be a detectable feature. Facial recognition software can be used to detect a presence of a person's face. Other visual recognition software can be used to detect other features. In some implementations, detecting 603 can be combined with receiving a metadata tag 602. For example, a user can select a feature of a digital image such as a region including a face, which acts as detecting 603, and the user can supply a corresponding metadata tag such as a name for the face to the association process.

The association process can select 604 a second media object from the group of media objects. A feature of the second media object's digital image can be detected 605. The association process can compare 606 the first media object's feature with the second media object's feature. For example, facial recognition software can be used to detect and compare a feature of the second media object with a feature of the first media object. If the faces match or approximately match, then the comparison can be true.

If the comparison is true 607, the process can associate 608 the metadata tag with the second media object and can finish 609. The metadata tag can be stored with the second media object, included in the media object, or can be associated with the media object by a link.

If the comparison is false 607, the process can determine 610 if there are more features in the second media object's digital image. If there are more features, then another feature of the second media object's digital image can be detected 611 and the process continues at comparison 606. For example, a digital image can include multiple faces and the facial detection software can be used to match a face to any or all of the faces included in the digital image. If there are no more features in the second media object 610, then the process can finish 609.

The comparison 606 can take into account variations in the compared features. Variations can include differences in shading, proportions, colors, hues, and other user configurable or process generated parameters. The degree of an acceptable variation can be configured by a user or an association process.

In some implementations, receiving 602 a metadata tag can be performed in a separate process. For example, a user can selectively tag a portion of the media objects included in a group. In photographic devices that are equipped with a text entry capability, a user can enter a tag and associate the tag to a media object such as a recently captured digital image. The association process can access this group and the associated tags. For each of the media objects with a metadata tag, the association process can automatically select each of the other media objects within the group as the second media object and perform items 605-611 as appropriate. In some implementations, a media object can obtain one or more associations through association 608.

Different comparison methods such as methods 502, 512, 606 can be used together. A union of multiple comparison methods between two media objects can be performed. For example, if any of the comparisons 502, 512, 606 are true, then a metadata tag of the first media object can be associated with the second media object.

An association process can be executed again when additional media objects are received or when a user adds additional metadata tags to existing media objects. Further, an association process can be executed again with different comparison criteria.

Figure 7:
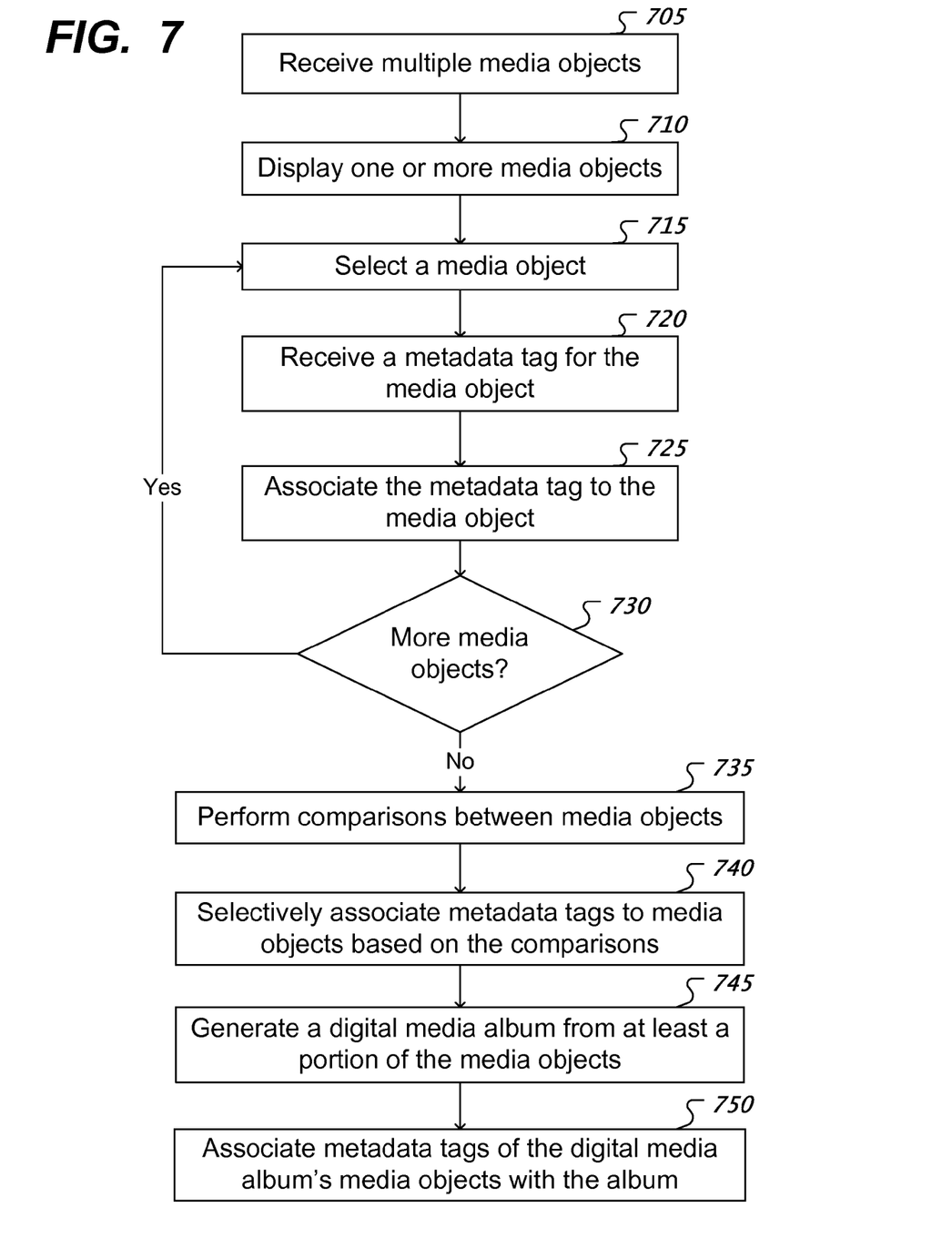
FIG. 7 shows an example of a process that performs comparisons between multiple media objects.

FIG. 7 shows an example of a process that performs comparisons between multiple media objects. The process can receive 705 multiple media objects. The media objects can be displayed 710 through a user interface. A user of the user interface or the process can select 715 a media object. The process can receive 720 a metadata tag for the media object. The metadata tag can be associated 725 with the selected media object. In some implementations, the received media objects can already be associated with one or more metadata tags. If a media object is associated with a tag, then the received 720 information can be used to edit, replace, or append the tag. The new or modify tag can be stored within the media object or separately from the media object. If the user wishes to select additional media objects or if there are more media objects to select 730, selection 715 can reoccur to select a different media object. Otherwise, the process can perform 735 comparisons between two or more of the received media objects. The process can select media objects, each associated with at least one metadata tag, to perform comparisons with other media objects. The comparison methods can include one or more method such as methods 502, 512, 606. The process can selectively associate 740 metadata tags to media objects based on the comparisons. For example, once the process yields a true comparison between a pair of media objects, a metadata tag of one of on the media objects in the pair can be associated with the other media object of the pair. Metadata tag information can be shared between both media objects in the pair, if both media objects are associated with metadata tags.

The process can generate 745 a digital media album from at least a portion of the media objects. Media object properties such as time, geographical coordinates, and features can be used to group media objects together to form a digital media album. In some implementations, the process can allow a user to select media objects to form an album. Metadata tags of the digital media album's media objects can be associated 750 with the digital media album. Likewise, a digital media album can be associated with metadata tags, and those metadata tags can be automatically associated with media objects of the album. Metadata tags can be searched, browsed, or displayed. Search results can be used to display matching album(s) and/or matching media object(s).

The subject matter described herein can also be applied to digital video. Digital video can include a sequence of frames. Each frame can be considered a digital image. A digital video can be represented by a sequence of media objects, each media object including a different frame of the digital video, or a media object that includes the sequence of frames. For labeling media objects, comparisons can be made between different media objects of a digital video or between media objects of different digital videos. For example, consider a filmmaker shooting a scene of a movie. The movie's script calls for Bob to enter the scene, say some dialog, and then walk out of the scene. The filmmaker or an editor can apply the present techniques to label movie frames with actors' names and later search for those frames that are associated with a specified actor or actors. A frame can also be labeled with information such as whether an actor is speaking.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the subject matter. Accordingly, other implementations are within the scope of the following claims.

What is claimed is:

1. A computer-implemented method comprising:
receiving, by a computer system, information comprising a plurality of media objects, including at least a first media object comprising a first digital image and a first set of metadata, and a second media object comprising a second digital image and a second set of metadata;
detecting a first feature of the first digital image, and detecting a second feature of the second digital image;
identifying similarities between the detected first feature of the first digital image and the detected second feature of the second digital image;
in response to the identifying the similarities between the detected first feature of the first digital image and the detected second feature of the second digital image, modifying, based on the identified similarities, a metadata tag within the second set of metadata of the second media object to include at least a portion of a metadata tag within the first set of metadata of the first media object that refers to the identified similarities; and
processing the second media object of the plurality of media objects based at least in part on the modified metadata tag.

2. The method of claim 1, wherein
the detected first feature of the first digital image comprises at least a first portion of the first digital image and
the detected second feature of the second digital image comprises at least a second portion of the second digital image.

3. The method of claim 2, wherein the detected first feature is a depiction of at least a portion of a person.

4. The method of claim 3, wherein the metadata tag within the first set of metadata of the first media object comprises a name of the person.

5. The method of claim 1, wherein the detecting the first feature, the detecting the second feature, and the identifying the similarities comprises:
accessing a first timestamp of the first media object;
accessing a second timestamp of the second media object; and
comparing the first timestamp with the second timestamp.

6. The method of claim 1, wherein the detecting the first feature, the detecting the second feature, and the identifying the similarities comprises:
    accessing first geographical coordinates of the first media object;
    accessing second geographical coordinates of the second media object; and
    comparing the first geographical coordinates with the second geographical coordinates.

7. The method of claim 1, further comprising:
    providing a user interface to present the first media object to a user; and
    displaying in the user interface a prompt that requests a metadata tag for the first media object.

8. The method of claim 1, wherein the first digital image of the first media object comprises a frame of a first digital video.

9. The method of claim 8, wherein the second digital image of the second media object comprises a frame of either the first digital video or a second digital video.

10. The method of claim 1, wherein the first and second media object represent different video frames in a digital video sequence.

11. The method of claim 1, wherein the processing comprises generating a digital media album responsive to results of the identifying, and organizing the plurality of media objects in the digital media album.

12. The method of claim 11, wherein the processing further comprises updating a corresponding metadata tag of each media object in the digital media album with the digital media album information, wherein the metadata tag was previously associated with fewer than all of the media objects in the digital media album.

13. A computer-readable storage medium encoded with a computer program, the program comprising instructions that when executed by data processing apparatus cause the data processing apparatus to perform operations comprising:
    receiving information comprising a plurality of media objects, including at least a first media object comprising a first digital image and a first set of metadata, and a second media object comprising a second digital image and a second set of metadata;
    detecting a first feature of the first digital image, and detecting a second feature of the second digital image;
    identifying similarities between the detected first feature of the first digital image and the detected second feature of the second digital image;
    in response to the identifying the similarities between the detected first feature of the first digital image and the detected second feature of the second digital image, modifying, based on the identified similarities, a metadata tag within the second set of metadata of the second media object to include at least a portion of a metadata tag within the first set of metadata of the first media object that refers to the identified similarities; and
    processing the second media object of the plurality of media objects based at least in cart on the modified metadata tag.

14. The computer-readable storage medium of claim 13, wherein
    the detected first feature of the first digital image comprises at least a first portion of the first digital and
    the detected second feature of the second digital image comprises at least a second portion of the second digital image.

15. The computer-readable storage medium of claim 14, wherein the detected first feature is a depiction of at least a portion of a person.

16. The computer-readable storage medium of claim 15, wherein the metadata tag within the first set of metadata of the first media object comprises a name of the person.

17. The computer-readable storage medium of claim 13, wherein the detecting the first, the detecting the second feature, and the identifying the similarities comprises:
    accessing a first timestamp of the first media object;
    accessing a second timestamp of the second media object; and
    comparing the first timestamp with the second timestamp.

18. The computer-readable storage medium of claim 13, wherein the detecting the first feature, the detecting the second feature, and the identifying the similarities comprises:
    accessing first geographical coordinates of the first media object;
    accessing second geographical coordinates of the second media object; and
    comparing the first geographical coordinates with the second geographical coordinates.

19. The computer-readable storage medium of claim 13, the operations further comprising:
    providing a user interface to present the first media object to a user; and
    displaying in the user interface a prompt that requests a metadata tag for the first media object.

20. The computer-readable storage medium of claim 13, wherein the first digital image of the first media object comprises a frame of a first digital video.

21. The computer-readable storage medium of claim 20, wherein the second digital image of the second media object comprises a frame of either the first digital video or a second digital video.

22. The computer-readable storage medium of claim 13, wherein the first and second media object represent different video frames in a digital video sequence.

23. The computer-readable storage medium of claim 22, further comprising identifying one or more video frames in the digital video sequence in which an event occurs, the event comprising a feature appearing in each of the identified frames.

24. The computer-readable storage medium of claim 13, wherein the processing comprises generating a digital media album responsive to results of the identifying, and organizing the plurality of media objects in the digital media album.

25. The computer-readable storage medium of claim 24, wherein the processing further comprises updating a corresponding metadata tag of each media object in the digital media album with the digital media album information, wherein the metadata tag was previously associated with fewer than all of the media objects in the digital media album.

26. A system comprising:
    a communication interface; and
    a processor coupled with the communication interface, wherein the processor is configured to perform operations comprising:
        receiving information from the communication interface, the information comprising a plurality of media objects, including at least a first media object comprising a first digital image and a first set of metadata, and a second media object comprising a second digital image and a second set of metadata;
        detecting a first feature of the first digital image, and detecting a second feature of the second digital image;
        identifying similarities between the detected first feature of the first digital image and the detected second feature of the second digital image;

in response to the identifying the similarities between the detected first feature of the first digital image and the detected second feature of the second digital image, modifying, based on the identified similarities, a metadata tag within the second set of metadata of the second media object to include at least a portion of a metadata tag within the first set of metadata of the first media object that refers to the identified similarities; and processing the second media object of the plurality of media objects based at least in part on the modified metadata tag.

27. The system of claim 26, wherein
the detected first feature of the first digital image comprises at least a first portion of the first digital image and
the detected second feature of the second digital image comprises at least a second portion of the second digital image.

28. The system of claim 27, wherein the detected first feature is a depiction of at least a portion of a person.

29. The system of claim 28, wherein the metadata tag within the first set of metadata of the first media object comprises a name of the person.

30. The system of claim 26, wherein the detecting the first feature, the detecting the second feature, and the identifying the similarities comprises:
accessing a first timestamp of the first media object;
accessing a second timestamp of the second media object; and
comparing the first timestamp with the second timestamp.

31. The system of claim 26, wherein the detecting the first feature, the detecting the second feature, and the identifying the similarities comprises:
accessing first geographical coordinates of the first media object;
accessing second geographical coordinates of the second media object; and
comparing the first geographical coordinates with the second geographical coordinates.

32. The system of claim 26, the operations further comprising:
providing a user interface to present the first media object to a user; and
displaying in the user interface a prompt that requests a metadata tag for the first media object.

33. The system of claim 26, wherein the first digital image of the first media object comprises a frame of a first digital video.

34. The system of claim 33, wherein the second digital image of the second media object comprises a frame of either the first digital video or a second digital video.

35. The system of claim 26, wherein the communication interface is coupled with a communication network.

36. The system of claim 26, further comprising a storage medium, wherein the storage medium is coupled with the communication interface.

37. A computer-implemented method comprising:
receiving, by a computer system, a digital video clip comprising a plurality of video frames and an associated set of metadata;
detecting a first feature of a first video frame of the plurality of video frames and detecting a second feature of a second video frame of the plurality of video frames;
identifying similarities between the detected first feature of the first video frame and the detected second feature of the second video frame; and
in response to the identifying the similarities between the detected first feature of the first video frame and the detected second feature of the second video frame, modifying, based on the identified similarities, at least a portion of the associated set of metadata to associate the identified similarities with the first video frame and the second video frame.

38. The method of claim 37, wherein the detected first feature comprises a depiction of at least a portion of a person.

39. The method of claim 38, wherein the at least a portion of a person comprises a facial feature.

40. The method of claim 38, wherein the modifying of at least a portion of the associated set of metadata comprises a name of the depicted person.

41. The method of claim 37, further comprising identifying one or more video frames of the plurality of video frames in which an event occurs based, at least in part, on the identified similarities.

42. A computer-readable storage medium encoded with a computer program, the program comprising instructions that when executed by data processing apparatus cause the data processing apparatus to perform operations comprising:
receiving, by a computer system, a digital video clip comprising a plurality of video frames and an associated set of metadata;
detecting a first feature of a first video frame of the plurality of video frames and detecting a second feature of a second video frame of the plurality of video frames;
identifying similarities between the detected first feature of the first video frame and the detected second feature of the second video frame; and
in response to the identifying the similarities between the detected first feature of the first video frame and the detected second feature of the second video frame, modifying, based on the identified similarities, at least a portion of the associated set of metadata to associate the identified similarities with the first video frame and the second video frame.

43. The computer-readable storage medium of claim 42, wherein the detected first feature comprises a depiction of at least a portion of a person.

44. The computer-readable storage medium of claim 43, wherein the at least a portion of a person comprises a facial feature.

45. The computer-readable storage medium of claim 43, wherein the modifying of at least a portion of the associated set of metadata comprises a name of the depicted person.

46. The computer-readable storage medium of claim 42, further comprising identifying one or more video frames of the plurality of video frames in which an event occurs based, at least in part, on the identified similarities.

47. The method of claim 10, further comprising identifying one or more video frames in the digital video sequence in which an event occurs, the event comprising a feature appearing in each of the identified frames.

* * * * *